Patented July 22, 1924.

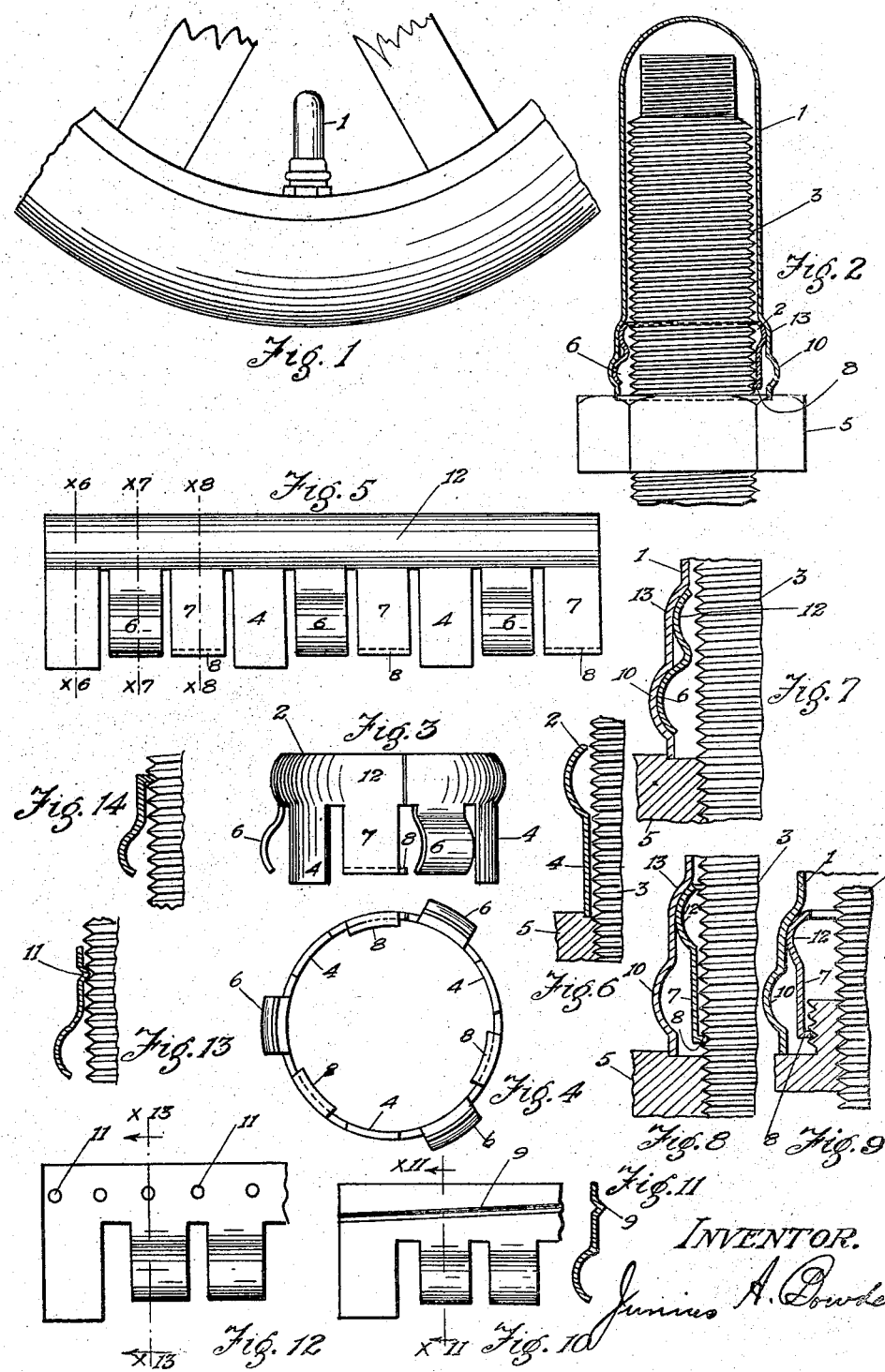

1,502,232

UNITED STATES PATENT OFFICE.

JUNIUS A. BOWDEN, OF LOS ANGELES, CALIFORNIA, ASSIGNOR TO A. SCHRADER'S SON, INCORPORATED, OF BROOKLYN, NEW YORK, A CORPORATION OF NEW YORK.

SPRING HOLDER FOR ATTACHING DUST CAPS.

Application filed February 3, 1920, Serial No. 356,054. Renewed August 16, 1922. Serial No. 582,644.

*To all whom it may concern:*

Be it known that I, JUNIUS A. BOWDEN, a citizen of the United States, residing at Los Angeles, in the county of Los Angeles, State of California, have invented a new and useful Improvement in Spring Holders for Attaching Dust Caps, of which the following is a specification.

This invention relates to a spring collar having securing means integral therewith for detachably connecting it to a member having a lodgment portion or threads that may be adaptable for engaging the securing means, the collar also having spring engaging means integral therewith, for holding a detachable cap, the object being to provide means for shielding the member and for ornamentation.

The main object of the invention is to provide spring means that is simple and inexpensive for holding a quick detachable cap upon a stem and for this purpose I provide a collar having means integral therewith for securing the collar separably and directly to the stem or a threaded like member, as for instance, the housing of a tire valve, and the collar having spring means integral therewith for detachably connecting the cap to the collar.

A further object is to provide a spring that is cheap and easy to replace and one that may be installed upon a stem or externally threaded nut independently or separately of the dust cap. In some cases where smaller valve stems are used, an externally threaded nut is used for these smaller stems; therefore, a further object of the invention is to provide a spring adaptable for detachably securing it to the external threads of such a nut, so as to simplify matters.

With these and other objects in view, the advantages of my improvement will be brought out fully and clearly in the following specifications and accompanying drawings.

Fig. 1 shows a dust cap 1, assembled upon the stem of a tire valve. Fig. 2 shows my preferred form of spring 2 and cap 1 in section. Fig. 3 shows a side elevation of the spring. Fig. 4 shows a plan view of the spring. Fig. 5 shows the spring as it may be formed flat before it is shaped round. Fig. 6 is a section through 6—6 of Fig. 5, and shows a detail in section of a leg 4, of the spring, in position relative to nut 5 and stem 3, the foot of the leg resting upon nut 5. Fig. 7 is a section through 7—7 of Fig. 5, and shows a flaring prong 6, of the spring, and the groove 10 of the cap, in section, engaging the tongue 6. Fig. 8 is a section through 8—8 of Fig. 5, and shows an extension member or support 7, of the spring and having formed therewith a portion 8, projecting inwardly, engaging a thread of the stem 3. Fig. 9, shows sectional views of a cap, a stem, a nut mounted on the stem and extension member 7, with a portion 8, of member 7, engaging a thread of the nut. Fig. 10 shows a modified form of spring, having similar parts, integral therewith, as in the preferred form, except portion 8. Fig. 11 shows a section of the modified form as through 11—11 of Fig. 10. Fig. 12 shows another modified form with respect to the means of securing the spring detachably connected to the stem, in this form the inwardly projecting portion is by a number of separate depressions 11, sectional detail of which, is clearly shown in Fig. 13, which is through 13—13 of Fig. 12. Fig. 14, shows a modified form of securing the spring to the stem, by having the inwardly projecting portion at the top of the spring. In any of these modified forms the prevailing idea of securing the spring to the stem is carried out, by an inwardly projecting portion of the spring integral therewith; other important features of the spring being substantially the same in each form, the idea being to broadly cover the feature whereby a portion of the spring projecting inwardly may engage a thread of the stem or nut for holding the spring detachably connected thereto, as means for detachably connecting a cap to the spring.

Referring to the details of the different drawings, Figs. 1, 2, 3, 4, 5, 6, 7, 8 and 9 show my preferred form, although the modified forms come within the scope of my invention.

In Fig. 3, I show a spring in the form of a split collar or band, the upper portion 12 of which is crowned, below this crown, there are three different branches, integral with the crown or collar; first, reading from left to right, 6 is a flaring spring prong. 4 is a support or leg. The third, 7, is a securing member having an inwardly projecting portion. There are preferably three of each of these branches to the spring or collar, but a more or less number may be employed. The object of the flaring prong is for engagement with cap 1, by means of the annular groove 10. The object of the leg 4, is to provide a stop or support for the spring against the nut, and to hold the flaring prongs in suspension, to provide for their free action when the cap is pressed upon them. The spring is attached to the tire valve stem 3 at 8, and the cap 1 is attached to the spring prong 6.

The branch 7 or member having a portion 8, projecting inwardly, is for the purpose of detachably securing the spring to the stem 3. The operation is to rotate the spring or collar over the threads of the stem, pressing it forward on the stem to facilitate the travel, by jumping some of the threads as it is not essential the inwardly projecting portion should engage each thread as the spring goes forward, then when the leg 4 stops on the base of the nut 5 and with the projecting portion engaging the threads, next the cap is pressed forward upon the flaring prongs and the prongs yield inwardly and engage the annular groove 10 of the cap, again expanding, registering with the groove and locking the cap to the spring. To remove the cap, simply pull it off and the spring remains attached to the stem, but the spring may be easily removed when a tire change is necessary.

The crown 12 of the spring forms an important function aside from giving strength to the very light metal of the spring, it flares out and forms an upper support for the cap at 13, so as to hold it from side motion and becoming loose and accidental displacement.

I do not limit myself to a split collar, but prefer to make it split for adjustability by spring action, furthermore as it will save time in installation and cost in manufacturing.

It is evident a closed collar having means of securing it to a tire valve stem and having yielding engagement means for connecting a detachable dust cap, will serve the same purpose from a practical standpoint as well as my split collar. I wish to broadly cover the idea of a threaded collar, or a collar having the inwardly projecting portion as means of securing it directly to a threaded or the like member, and having yielding means integral with the collar, for holding a cap detachably connected thereto.

Having thus described my invention, what I claim is:

1. A new article of manufacture formed entirely of sheet metal for mounting a quick detachable cap upon a tire valve stem, comprising a spring collar having means integral therewith adapted to detachably secure the collar directly to the exterior of said stem, said collar having a spring portion integral therewith adapted to frictionally hold a dust cap in engagement with said spring collar.

2. In combination, an exteriorly threaded member, a dust cap adapted to enclose said member and means for detachably holding said dust cap on said member, said means comprising a spring metal collar having integral means adapted to engage the threads of the threaded member to detachably secure the collar thereto and contractile spring arms adapted to frictionally engage the inner wall of the dust cap with sufficient force to maintain the dust cap thereon, so that the dust cap can be applied over and removed from the threaded member without displacing the holding means.

3. A new article of manufacture for holding a detachable cap upon a member, having exterior threads, comprising a spring collar having inwardly projecting portions with lips adapted to engage said threads to detachably secure said collar to said member, said collar having flaring spring branches adapted to frictionally hold a dust cap in engagement with said collar.

4. Spring means providing a detachable mounting for a dust cap on a valve stem or the like, comprising an endless band having resilient means for gripping a valve stem and means for engaging a dust cap to hold the cap thereon, the gripping means being adapted to engage the valve stem with greater effect than the engaging means are adapted to hold the dust cap, whereby the dust cap may be removed by a pulling force from the spring means when the latter engages a valve stem.

5. Spring means providing a detachable mounting for a dust cap on a valve stem or the like, comprising an endless band having resilient gripping members for gripping a valve stem and resilient wings for engaging a dust cap to hold the cap thereon, the gripping members being adapted to engage the valve stem with greater effect than the resilient wings are adapted to hold the dust cap, whereby the dust cap may be removed by a pulling force from the spring means when the latter engages a valve stem.

In testimony whereof, I have hereunto set my hand, at Los Angeles, California, this 26th day of January, 1920.

JUNIUS A. BOWDEN.